J. S. BOYUM.
CRADLE FOR RANGE FINDERS.
APPLICATION FILED NOV. 1, 1910.
1,032,873.
Patented July 16, 1912.
5 SHEETS—SHEET 5.
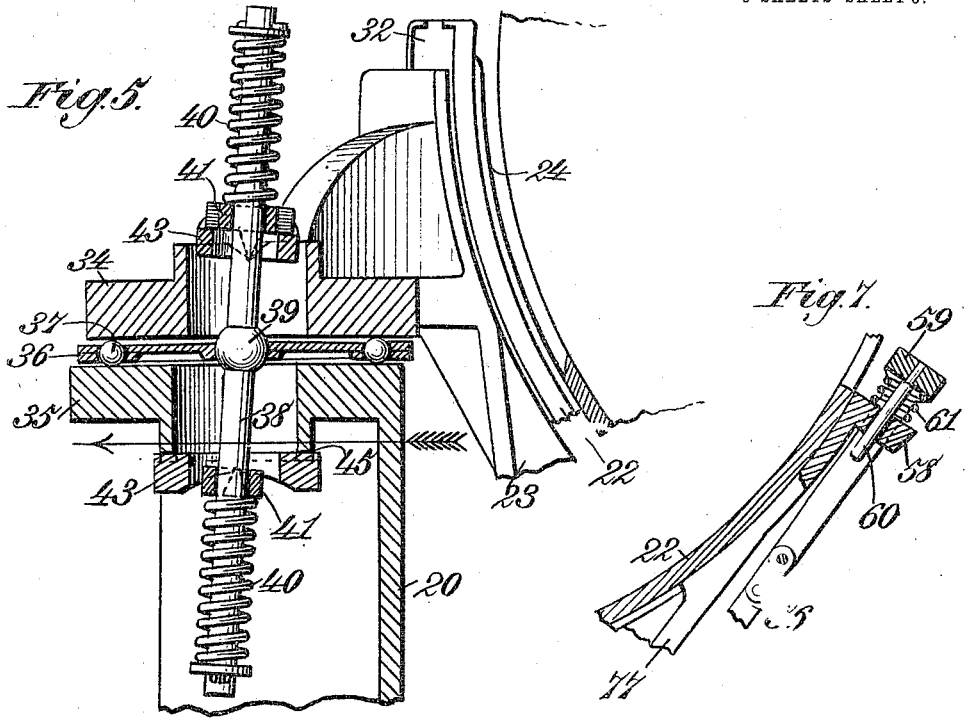
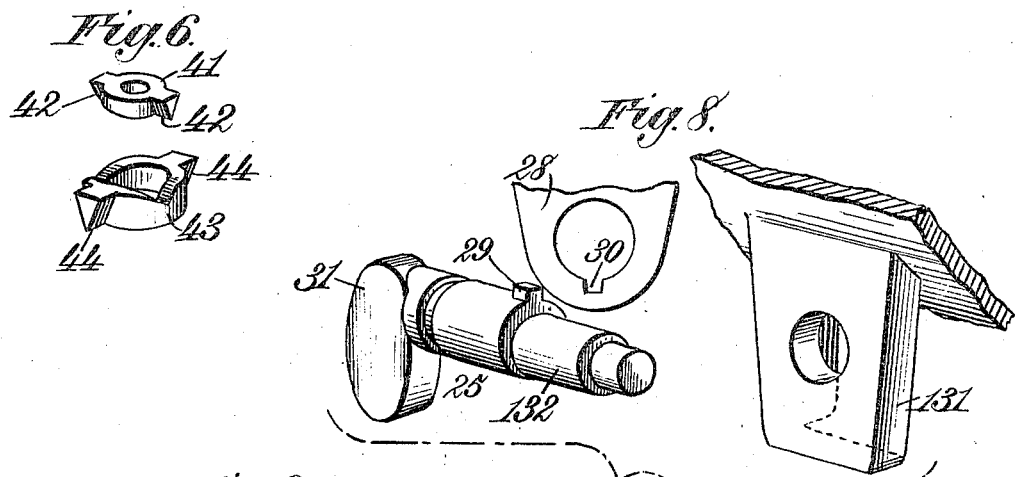
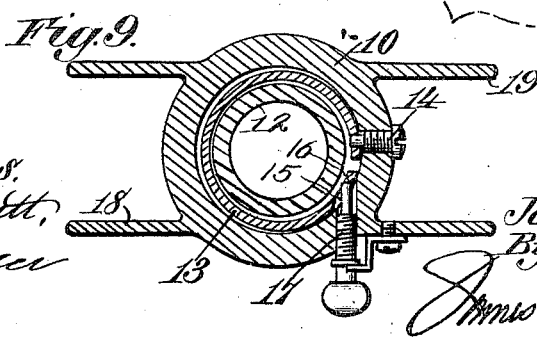
Witnesses.
Inventor.
John S. Boyum.

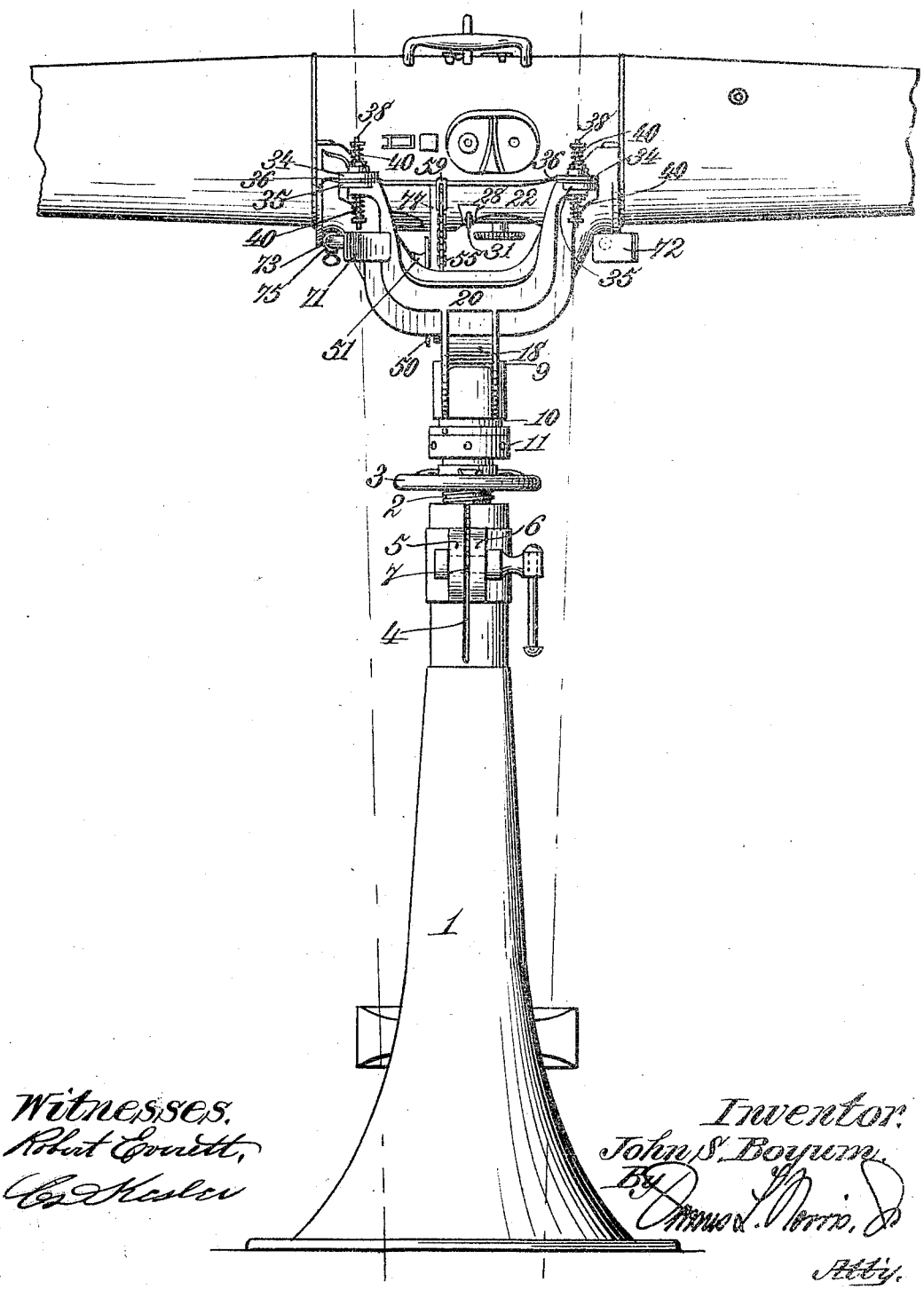

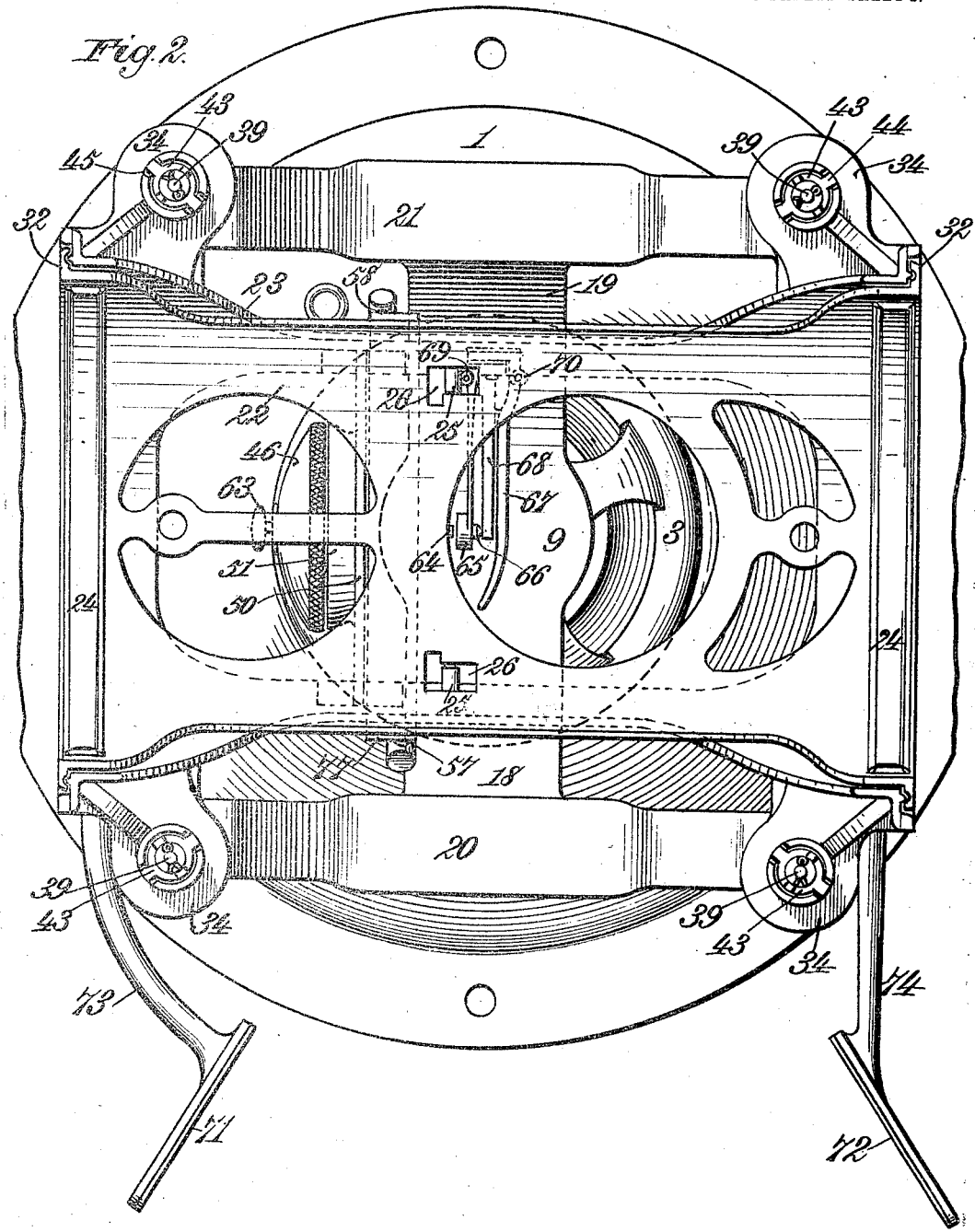

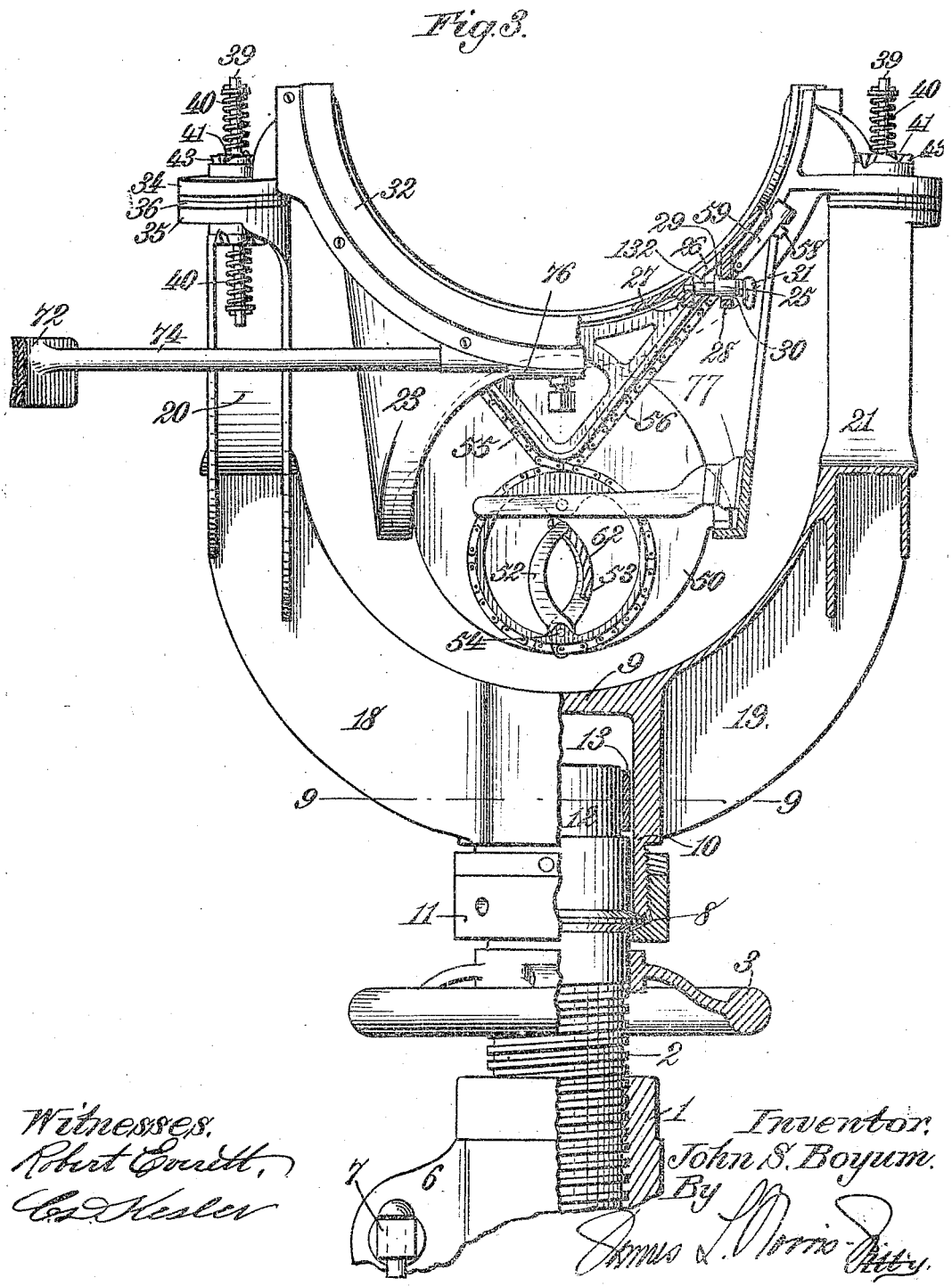

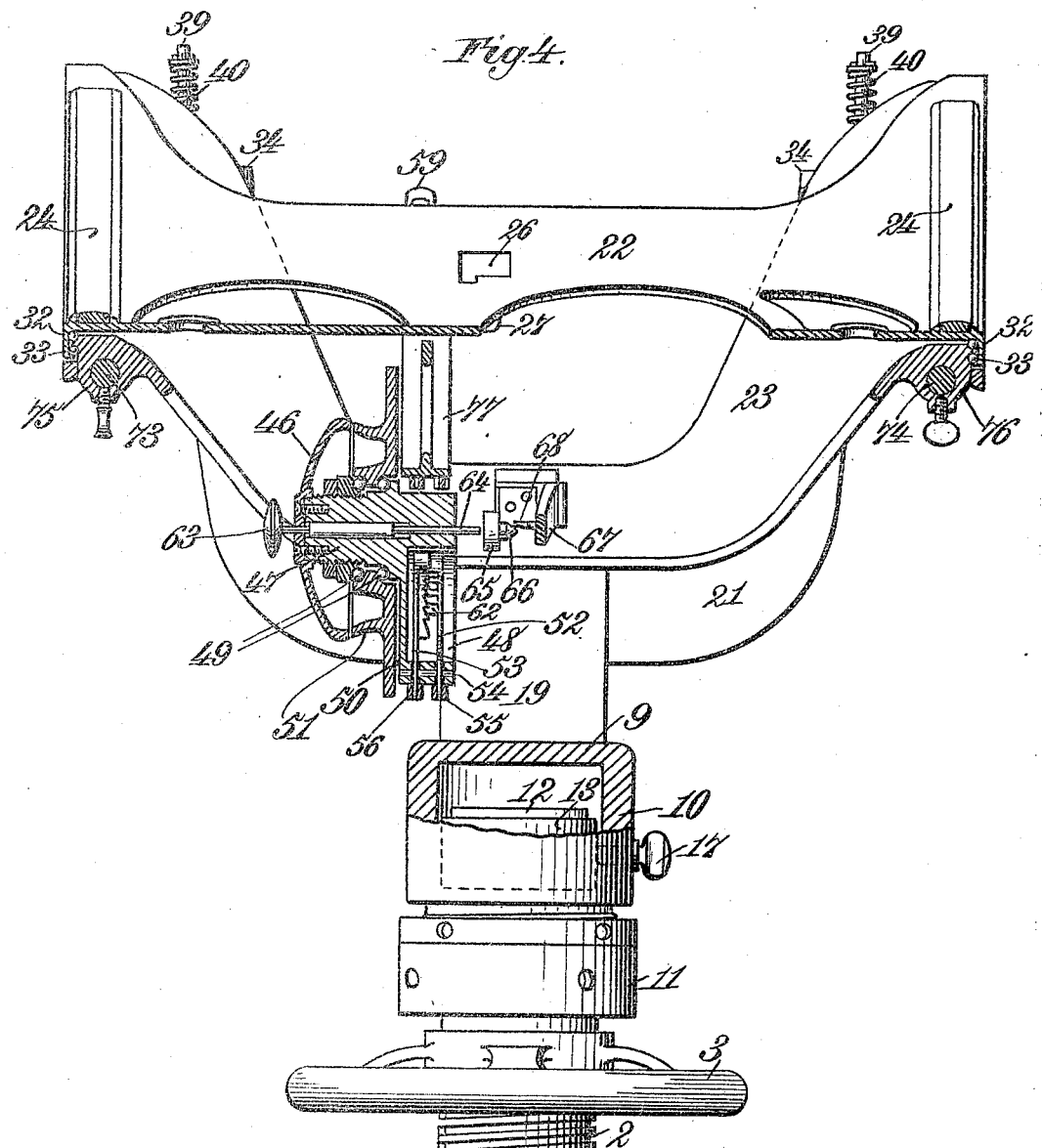

UNITED STATES PATENT OFFICE.

JOHN S. BOYUM, OF NASHVILLE, TENNESSEE.

CRADLE FOR RANGE-FINDERS.

1,032,873.   Specification of Letters Patent.   Patented July 16, 1912.

Application filed November 1, 1910. Serial No. 590,135.

*To all whom it may concern:*

Be it known that I, JOHN S. BOYUM, a citizen of the United States, residing at Nashville, in the county of Davidson and State of Tennessee, have invented new and useful Improvements in Cradles for Range-Finders, of which the following is a specification.

My present invention relates to improvements in cradles for range finders, and it has for its object primarily to provide a generally improved structure of this character which is capable of supporting the range finder aboard ship in such manner as to relieve the instrument of shocks due to tremors, or other vibratory movements of the ship and which also enables the operator to adjust the position of the range finder with facility in order that the instrument may be pointed toward an object and maintained precisely in the proper direction, irrespective of movement of the ship or platform upon which the instrument is supported.

Another object of the invention is to provide improved means for mounting the instrument-supporting cradle whereby this cradle and the instrument supported thereon may be readily adjusted about a horizontal axis, and to provide a novel device for adjusting the cradle about such an axis, this adjusting device being so connected to the cradle as to permit the latter to be easily adjusted by the hand of the operator, and this adjusting device is preferably provided with a coöperative annular finger grip which is so related to the adjusting device as to enable the operator to easily maintain any desired adjustment and to also steady himself with respect to the instrument.

Another object of the invention is to provide a compensating support for the cradle which will permit relative shifting movements to occur between the cradle and that part of the stand which is fixed to the ship, such relative shifting movements preferably taking place about a radius of appropriate length and enabling the cradle and the instrument thereon to remain stationary or substantially so notwithstanding tremors or other vibratory movements of the ship whereby the operator's view of an object through the instrument will be undisturbed, the necessary adjustments may be made without interference, and there is no strain transmitted to the instrument from the ship.

Further objects of the invention are to provide novel means operatively associated with the cradle-adjusting device whereby the same hand of the operator which is used to adjust the cradle may serve to conveniently control the illuminating and extinguishing of the electric illuminator which renders the scale of the instrument clearly readable, to provide a simple and improved brake for maintaining the instrument at any desired angle of adjustment about its vertical axis, and to provide other detail improvements in a structure of this character.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents in elevation a cradle constructed in accordance with my present invention for supporting a range finder; Fig. 2 represents a top plan view of the structure on an enlarged scale, the instrument being removed; Fig. 3 represents in elevation the upper portion of the structure, one half of the same being shown in section so as to illustrate more clearly certain details; Fig. 4 also shows on an enlarged scale the upper portion of the structure, parts being shown in section and illustrating in detail the mounting for the cradle, the hand-operated device for adjusting the cradle, and the device for controlling illumination of the lamp which renders the scale of the instrument clearly readable; Fig. 5 is a detail enlarged view showing in section one of the compensating connections between the cradle and the lower or base portion of the structure; Fig. 6 shows in perspective two of the gimbal rings forming part of one of the compensating connections; Fig. 7 is a detail sectional view showing a tensioning device for the terminal of one of the chains connecting the cradle and its adjusting device; Fig. 8 is a collective view showing a part of the cradle and one of the locking pins or keys for preventing displacement of the instrument relatively to the cradle; and Fig. 9 represents a section on the line 9—9 of Fig. 3.

Similar parts are designated by the same reference characters in the several views.

In the accompanying drawing, I have shown one form of the invention and this form is generally preferable, as practice has demonstrated that it is capable of successfully carrying out the objects of my invention. It will be understood, however, that this form of the invention is shown in the drawing as an example of one embodiment of the invention, and that other embodiments involving changes in the detail construction of certain parts or in the relative arrangement of certain parts are to be included within the scope of the claims at the end of the specification.

In the present instance, the apparatus embodies a base 1, the lower end of which is preferably flared or broadened to adapt it for secure attachment to a suitable part of a ship or other means of support. The upper portion of this base is threaded to receive a vertical screw 2, this screw having a suitable pitch to enable the operator to readily adjust the elevation of the instrument with respect to the support upon which the base rests. The screw 2 is provided with a hand-wheel 3 or its equivalent to enable it to be readily revolved, and suitable means is provided for locking the screw 2 so as to maintain the desired adjustment. In the present instance, the upper threaded end of the base is provided with a slot 4 which renders this threaded part of the base compressible, and lugs 5 and 6 are formed on the threaded portion at opposite sides of the slot. A bolt 7 extends through the lugs and serves to clamp and release the screw. The screw 2 is provided at a point above the hand-wheel with a circumferential shoulder 8, the upper and lower faces of the shoulder being preferably beveled, as shown, and this shoulder serves to support a head 9 which sustains the instrument. The head 9 is adjustable about the screw 2 as a vertical axis, the shoulder 8 sustaining the weight of the head and in the present instance the head has a sleeve 10 which fits down over the top of the screw and rests at its lower edge upon the upper side of the shoulder thereon. A ring 11 is threaded upon the sleeve 10 and has a flange which coöperates with the underside of the shoulder 8 and thereby prevents displacement of the head with respect to the screw.

In order to frictionally retain the head at the different desired adjustments about the screw as a vertical axis, the upper end of this screw is preferably provided with a brake surface 12 which is surrounded by a brake band 13. One end of the brake band is held stationary by a screw 14 which is tapped into the sleeve 10 of the head. The other end of the brake band is capable of relative circumferential movement in order that it may clamp and release the brake portion on the screw. In the present instance, the movable end of the brake band has an aperture 15 which forms a shoulder 16, and a screw 17 is tapped tangentially into the sleeve 10 and coöperates at its inner end with this shoulder 16 formed on the movable end of the brake band. By revolving the screw 17 in the proper direction, it will exert a pressure upon the shoulder 16 that will cause the brake band to firmly grip the brake surface formed on the screw 2.

The head 9 is formed with a pair of oppositely extending and upwardly curved arms 18 and 19, and the upper portions of these arms are branched to form yokes 20 and 21. These arms are suitably ribbed in order to afford the requisite rigidity and strength. The head is surmounted by a cradle 22 which according to the present invention supports the instrument and serves to adjust it about a horizontal axis. In the present instance, this cradle is substantially semi-circular in cross section and it fits into a correspondingly shaped cradle-carrier 23. In order that this cradle may readily receive the instrument and support it without injury, it is preferably provided toward its opposite ends with linings 24 of cork, felt or other soft or yieldable material. The instrument may be held from displacement in the cradle by means of a pair of locking bolts or keys 25, the cradle having a pair of slots or openings 26 through which a locking lug on the instrument may project, and each key is adapted to enter a pair of depending lugs 27 and 28 formed on the under side of the cradle. These locking bolts or keys may be retained in position by forming a ward 29 on each key which, when the key is turned into one position, will register with and pass through a notch 30 in one of these lugs and while each locking bolt or key is in locking position, this ward may be held out of registration with the notch by forming the bolt or key with a handle or thumb-piece 31 which is weighted at one side of the axis of the key. The instrument casing is provided with a pair of locking lugs 131 which are apertured to receive the respective keys on the cradle and the lugs are also preferably angle-shaped so as to register with and enter the angle-shaped slots 26 in the cradle when the instrument is properly mounted. Each key 25 is preferably provided with an eccentric portion 132 to engage the aperture in the respective locking lug on the instrument, so that when the keys are turned toward locking position, the instrument will be drawn down into firm engagement with the cradle.

To enable the cradle to be adjusted easily, a suitable anti-friction bearing may be provided between the cradle and the cradle-carrier. In the present instance, the opposite ends of the cradle are formed with flanges 32 and the opposite ends of the cradle-carrier 23 are semi-circular and opposed to these flanges, ball races being thereby provided for the double sets of balls 33.

According to the present invention, I provide a compensating connection between the cradle and its carrier and the lower part of the structure which is immovably attached to the ship or other support whereby the instrument will be capable of remaining substantially immovable notwithstanding the tremors, or other vibratory movements of the ship or support. This feature of my invention enables the operator to train the instrument upon an object with the greatest facility, the necessary delicate adjustments can be made quickly and without being interfered with by the shifting or vibration of the platform upon which the instrument is supported and, moreover, the instrument will not be subjected to constant strain. In the present instance, the four corners of the cradle-carrier 23 are formed with bearing lugs 34, and the upper ends of the yokes 20 and 21 are formed with correspondingly arranged bearing lugs 35. The surfaces of these two sets of opposed bearing lugs are preferably struck from a common radius of appropriate length in order that these surfaces may conform substantially to the axis about which the vibratory or other movements take place. To minimize friction, an anti-friction bearing of suitable construction is interposed between each pair of bearing lugs. In the present instance, I have shown an anti-friction bearing composed of a disk 36 fitted with an annular series of balls 37 which coöperate with the opposed bearing surfaces. To prevent displacement of the cradle and its carrier with respect to the lower part of the structure, I provide means for constantly exerting a yielding pressure upon these bearings, but this pressure-exerting means is capable of conforming to relative movement in any direction between the cradle and its carrier and the lower part. In the present instance, I provide a rod 38 for each bearing, this rod having a spherical portion 39 at its center which is retained but has a rocking movement in the center of the disk 36, and the opposite ends of this rod extend beyond the respective bearing lugs and are fitted with compression springs 40. The inner end of each spring bears upon an inner ring 41 which has diametrically opposed knife edges 42 which coöperate with a second or outer ring 43. This outer gimbal ring is provided with a pair of knife edges 44 which are diametrically opposite to one another and arranged at right angles to the points of this ring which are engaged by the knife edges 42 of the ring 41. The knife edges 44 of the outer ring 43 rest in bearing recesses 45 formed in the respective bearing lugs. In Fig. 5, I have shown diagrammatically the position assumed by the parts when a relative shifting movement occurs between them.

I provide a simple and novel device whereby the cradle may be adjusted easily about its horizontal axis. This device in the present instance consists of a head or wheel 46 which is of a diameter that will enable it to fit into the palm of the operator's hand so as to enable the finger tips and the thumb to overlap its periphery, and the face of this head or wheel is also preferably of convex form. This head is attached in any suitable way to a hub 47 and the said hub has a drum 48 attached thereto, the axis of the drum being offset below or arranged eccentrically to the axis of the hub 47. This hub 47 in the present instance is revolubly supported by an anti-friction bearing 49 formed partly in the hub and partly in a stationary plate 5. This plate 50 is a part of the cradle carrier and has an annular flange 51 formed thereon which is of a diameter slightly less than the maximum diameter of the head or wheel 46, and this flange is practically a non-rotary continuation of the circumference of the head or wheel 46 so that when the head or wheel 46 is grasped by the hand of the operator, the tips of the fingers and thumb will overlap the non-rotary flange 51 and, by gripping this non-rotary flange 51 by the finger tips and thumb, the head or wheel 46 may be effectually held from rotation and in this manner the cradle may be retained at any desired adjustment. This head 46 and the flange 51 also may serve as steadying means for the operator.

The eccentric drum 48 serves when rotated as part of the adjusting means for the instrument-supporting cradle. In the present instance, this drum contains a pair of reversely arranged levers 52 and 53 which are mounted upon a pin 54 as an axis, and their ends project slightly beyond the circumference of the drum. A pair of chains 55 and 56 are connected to the exposed extremities of the levers 52 and 53 respectively, each chain extending approximately half way around the drum and then proceeding to the point where it is attached to the cradle. These chains are crossed or arranged in reverse relation so that a rocking movement of the drum 48 in one direction will produce a tilting of the cradle in a reverse direction. The terminals of the chains 55 and 56 are attached to the cradle by means of the lugs 57 and 58. In the present instance, I provide attaching means for these terminals of the chains which will maintain the chains under yielding tension so as to avoid any slack, each of these devices consisting of a yoke 59 which is attached to the extremity of its respective chain and has a pin 60 which operates freely through an aperture in its respective lug. A compression spring 61 is interposed between the yoke and the lug and as this spring is under compression, it will maintain the chain under tension. The chains, however, may be readily tightened simultaneously by means of the levers 52 and 53, these levers being each formed with a number of teeth 62 to coöperate with one another, and by turning both levers about the pin 54 as an axis, both chains will be tightened.

In order to enable the operator to readily illuminate and extinguish the lamp which serves at night to illuminate the scale of the instrument, I provide a press-button 63 which extends through the center of the cradle-adjusting head or wheel 46 and is connected to a plunger 64 which projects axially through the hub 47. The inner end of this plunger 64 is arranged to press against an arm 65 which is slightly yieldable and carries a contact point 66. A second rigid arm 67 is attached to the cradle-carrier 23 and supports a coöperative contact point 68. A pressure upon the button 63 will cause the contact points 66 and 68 to engage one another and thereby establish a circuit through the lamp. The arms 65 and 67 may be provided with sockets 69 and 70 for the reception of plugs forming part of the lamp circuit.

To enable the instrument to be directed or turned about its vertical axis with facility, I preferably employ a pair of rests 71 and 72 adapted to be engaged by outer portions of the shoulders of the operator whereby the latter may readily adjust the instrument about its vertical axis. These rests are supported by arms 73 and 74 which enter sockets 75 and 76 in the cradle-carrier 23. These arms may be adjusted in a forward or rearward direction in their respective sockets and secured in proper adjusted position by any suitable means such, for instance, as by the set-screws, as shown. The arm 73 for the left-hand rest 71 is offset to conform to the position of the operator when the left eye is applied to the eye-piece of the instrument. The chains 55 and 56 coöperate with a guard 77 which is attached to the cradle-carrier and serves as a lever which during adjustment of the cradle and its carrier swings across the top of the drums, the chains acting on this lever to effectively transmit motion from the drum to the cradle-carrier, and loosening of the chains due to the eccentricity of the drum is prevented.

As the adjusting device for the cradle and the various adjusting devices for the instrument are supported in such a manner that they remain in fixed relation to the instrument and its supporting cradle, it is obvious that the operator will be able to manipulate the instrument with facility, notwithstanding relative shifting movements of the base, owing to rolling, pitching or vibration of the ship. By providing rests arranged to be engaged by the shoulders of the operator, the instrument may be readily adjusted and steadied on its vertical axis by appropriate movements of the operator's shoulders, and as the shoulder rests are attached to the cradle-carrier, rolling, pitching or vibratory movements of the ship will not disturb the relation between the operator and the instrument.

I claim as my invention:

1. In an apparatus of the class described, the combination of a base, and a cradle adapted to receive and support a range finder and adjustable relatively to the base about a horizontal axis.

2. In an apparatus of the character described, the combination of a base, and a cradle recessed to form a seat to receive and support a range finder and adjustable relatively to the base about a horizontal axis.

3. The combination of a base, a cradle shaped to receive and support a range finder and adjustable relatively to the base about a horizontal axis, and means connected to the cradle for adjusting it.

4. The combination of a base, a cradle adapted to receive and support a range finder and adjustable relatively to the base about a substantially horizontal axis, a cradle-carrier shiftable relatively to the base, and a cradle-adjusting device mounted on the cradle-carrier and operatively connected to the cradle.

5. The combination of a base, a cradle adjustable relatively to the base about a substantially horizontal axis and having means for locking a range finder thereto, a cradle-carrier shiftable relatively to the base in a substantially horizontal direction, and means on the cradle-carrier and cradle for adjusting the latter.

6. The combination of a base, a range finder supporting cradle adjustable relatively to the base, a rotatable drum having means for operating it, and operative connections between the drum and the cradle.

7. The combination of a base, a cradle adjustable on a horizontal axis relatively thereto, a cradle-carrier shiftable relatively to the base, an eccentrically mounted drum carried by the cradle-carrier and having means for rotating it, and operative connections between the drum and the cradle.

8. The combination of a base, a cradle adjustable relatively thereto on a horizontal axis, a rotatable drum, operative connections between the drum and the cradle for rocking the latter as the drum is rotated, and means for taking up slack in said operative connections.

9. The combination of a base, a cradle adjustable relatively thereto on a horizontal axis, a rotatable drum having means for operating it, operative connections between the drum and the cradle, and devices for maintaining said operative connections under tension.

10. The combination of a base, a cradle adjustable relatively thereto about a horizontal axis, a rotatably mounted drum, a pair of coöperative levers pivoted on the drum, and a corresponding pair of operative connections between the ends of said levers and the cradle, said levers serving to take up slack in said operative connections.

11. The combination of a base, a cradle adjustable relatively thereto about a horizontal axis, a rotatably mounted hand-wheel operatively connected to the cradle for rocking it, said hand-wheel adapted to be gripped by the hand of the operator, and a relatively stationary flange arranged immediately adjacent to the hand-wheel and adapted to be gripped by the fingers of the operator.

12. The combination of a base, a cradle adjustable relatively thereto about a horizontal axis, a carrier supporting the cradle and shiftable relatively to the base, a rotatable hand-wheel mounted on said cradle carrier and operatively connected to the cradle, said hand-wheel having a convex surface adapted to be engaged by the palm of the hand of the operator, and a stationary flange on the cradle-carrier arranged immediately adjacent to the peripheral portion of the hand-wheel and forming a continuation thereof, said stationary flange adapted to be gripped by the fingers of the operator.

13. The combination of a base, a range finder supporting cradle adjustable relatively thereto on a horizontal axis, a cradle-carrier shiftable horizontally relatively to the base, a hand-wheel rotatably mounted on a part of the cradle-carrier and operatively connected to the cradle, said hand-wheel adapted to be gripped by the hand of the operator, an electric switch mounted on the cradle-carrier, and a press-button projecting from the face of said hand-wheel and having means for operatively connecting it to the switch.

14. The combination of a base, a cradle, and a cradle-carrier, the cradle-carrier having a compensating connection with the base.

15. The combination of a base, a range finder supporting cradle, a carrier for said cradle, and a bearing formed between said carrier and base for permitting the cradle and carrier to remain stationary during shifting movements of the base.

16. The combination of a base, a range finder supporting cradle, a carrier supporting said cradle, and compensating bearings between said carrier and base, said bearings having operative faces formed upon a common radius.

17. The combination of a base, a range finder supporting cradle, a carrier for said cradle, bearings between said carrier and base for permitting the latter to shift laterally while the carrier and cradle remain stationary, and devices forming universal connections between said bearings for yieldingly retaining said bearings in coöperative relation.

18. The combination of a base having bearing surfaces thereon, a range finder supporting cradle, a carrier for said cradle having bearings thereon coöperative with those on the base, and devices for retaining the bearings in coöperative relation but permitting relative horizontal shifting movements between the parts, each device embodying a rod having compression springs toward opposite ends, and sets of inner and outer gimbal rings interposed between said springs and the base and cradle respectively.

19. The combination of a base, a head rotatable relatively to the base on a vertical axis and having means for supporting a range finder thereon, and a friction brake interposed between the head and base to resist relative rotation between the parts on the vertical axis.

20. The combination of a base, a vertical screw fitted therein, a device for preventing rotation of the screw with respect to the base, a range finder supporting head rotatably mounted upon the upper end of said screw, and a friction brake interposed between said head and screw.

21. The combination of a base, a range finder supporting cradle, a carrier supporting said cradle and capable of remaining substantially stationary during lateral movement of the base, and rests connected to the cradle-carrier and adapted to be engaged and manipulated by the shoulders of the operator.

In testimony whereof I have hereunto set my hand in presence of two subscribing witnesses.

JOHN S. BOYUM.

Witnesses:
JAMES L. NORRIS, Jr.,
CHAS. S. HYER.

---

Copies of this patent may be obtained for five cents each, by addressing the "Commissioner of Patents, Washington, D. C."